United States Patent
Kelly

(10) Patent No.: US 8,018,504 B2
(45) Date of Patent: Sep. 13, 2011

(54) REDUCTION OF POSITION DEPENDENT NOISE IN A DIGITAL IMAGE

(75) Inventor: Sean C. Kelly, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 552 days.

(21) Appl. No.: 11/615,223

(22) Filed: Dec. 22, 2006

(65) Prior Publication Data

US 2008/0152248 A1 Jun. 26, 2008

(51) Int. Cl.
- *H04N 5/217* (2006.01)
- *H04N 17/00* (2006.01)
- *H04N 5/225* (2006.01)
- *H04N 5/228* (2006.01)
- *G06K 9/40* (2006.01)

(52) U.S. Cl. ............ 348/241; 348/188; 348/207.1; 348/222.1; 382/260; 382/275

(58) Field of Classification Search .......... 396/319, 396/55; 382/260–266, 275; 348/241, 222.1–225.1, 348/252–255, 187–188, 231.3–231.6, 248–250, 348/207.1, 229.1, 207.2
See application file for complete search history.

(56) References Cited

U.S. PATENT DOCUMENTS

| | | | | |
|---|---|---|---|---|
| 4,783,840 A * | 11/1988 | Song | | 382/261 |
| 5,448,304 A * | 9/1995 | Chmielewski et al. | | 348/619 |
| 5,696,850 A | 12/1997 | Parulski et al. | | |
| 6,628,329 B1 * | 9/2003 | Kelly et al. | | 348/252 |
| 6,937,775 B2 * | 8/2005 | Gindele et al. | | 382/254 |
| 7,034,892 B2 * | 4/2006 | Ojo et al. | | 348/607 |
| 7,054,501 B1 * | 5/2006 | Gindele et al. | | 382/266 |
| 7,092,017 B2 | 8/2006 | Kelly et al. | | |
| 7,139,437 B2 * | 11/2006 | Jones et al. | | 382/261 |
| 7,280,141 B1 * | 10/2007 | Frank et al. | | 348/243 |
| 7,292,733 B2 * | 11/2007 | Monobe et al. | | 382/261 |
| 2005/0219363 A1 * | 10/2005 | Kohler et al. | | 348/187 |
| 2005/0276504 A1 * | 12/2005 | Chui et al. | | 382/264 |
| 2006/0050980 A1 * | 3/2006 | Kohashi | | 382/254 |
| 2007/0013794 A1 * | 1/2007 | Tsuruoka | | 348/241 |

\* cited by examiner

*Primary Examiner* — Jason Chan
*Assistant Examiner* — Michael Osinski
(74) *Attorney, Agent, or Firm* — Kevin E. Spaulding

(57) ABSTRACT

Noise is reduced in a digital image generated by an imaging device utilizing information which specifies noise level as a function of position for the digital image. A noise reducing algorithm is applied to the digital image while one or more parameters of the noise reducing algorithm are varied. The one or more parameters are varied as a function of field position in the digital image based on the obtained noise level as a function of field position. In this way, noise is substantially reduced and is spatially equalized in the digital image.

17 Claims, 5 Drawing Sheets

1/5

REDUCTION OF POSITION DEPENDENT NOISE IN A DIGITAL IMAGE

FIELD OF THE INVENTION

The present invention relates generally to digital imaging systems, and, more particularly, to the reduction of field position dependent noise in digital images.

BACKGROUND OF THE INVENTION

In a camera, the image formed at a focal plane where the film or image sensor is located may be blurred as a function of proximity to the optical axis of the camera. The further away a portion of an image is located from the optical axis (normally the center of the image), the more that portion may be blurred. The problem is exaggerated with images originating from inexpensive cameras, such as single-use cameras. Because of their simple optics or because the film may not be located in the position of best focus throughout the focal plane, single-use cameras tend to have significant sharpness loss with movement away from the optical axis toward the edges of the camera's image frame.

Image processing techniques have been designed to correct for field position dependent blur in digital images. Commonly-assigned U.S. Pat. No. 6,628,329 to Kelly et al., entitled "Correction of Position Dependent Blur in a Digital Image," for example, teaches modifying the strength of a blur correcting algorithm (e.g., sharpening filter) as a function of position in a field, and is incorporated herein by reference. Such techniques tend to substantially improve perceived image quality. Even so, the application of such image processing techniques to a digital image may also increase noise in that image. Typically, the greater the amount of blur correction applied, the greater the amount of noise generated. Accordingly, the application of a blur correction algorithm that is field position dependent may enhance noise in a manner that is also field position dependent.

Several noise reducing algorithms such as speckle filtering, mean filtering, median filtering, local region filtering, and sigma filtering have been developed for reducing noise in digital images. In a typical sigma filtering algorithm, for example, the signal value of a pixel being filtered is replaced by a value which is determined by averaging the signal values of neighboring pixels that have values that lie within a fixed standard deviation range of the signal value of the pixel being filtered. This type of filtering is based on the assumption that noise occurs in a digital image with a Gaussian distribution so that effective noise suppression is possible within the standard deviation range. If there is a greater difference in signal value between a neighboring pixel and the filtered pixel, there is a high probability that this difference is not a result of noise, but is instead a result of some other content of the digital image. This neighboring pixel's signal value should, therefore, not be included in the averaging.

Nevertheless, such conventional noise reducing algorithms are not optimized to correct for noise intensities that are field position dependent. There is, as a result, a need for an effective method of correcting noise in digital images with noise intensities that vary as a function of field position.

SUMMARY OF THE INVENTION

Embodiments of the present invention address the above-identified need by providing methods and apparatus for reducing field position dependent noise in digital images.

In accordance with an aspect of the invention, noise is reduced in a digital image generated by an imaging device utilizing information which specifies noise level as a function of position for the digital image. A noise reducing algorithm is applied to the digital image while one or more parameters of the noise reducing algorithm are varied. The one or more parameters are varied as a function of field position in the digital image based on the obtained noise level as a function of field position.

In an illustrative embodiment, an imaging system comprises a digital camera and a general purpose computer. A digital image generated by the digital camera comprises noise that varies with field position. A modified sigma filter algorithm is applied to the digital image using the computer. The filter range of the modified sigma filter algorithm is changed for each field position in the digital image based on a predetermined noise level at each respective field position. The modified sigma filter algorithm is thereby adapted to respond to local noise levels. Noise in the digital image is substantially reduced and is spatially equalized in this manner.

These and other features and advantages of the present invention will become apparent from the following detailed description which is to be read in conjunction with the accompanying drawings.

DETAILED DESCRIPTION OF THE INVENTION

The present invention will be described with reference to illustrative embodiments. It is appreciated that numerous modifications can be made to these embodiments and the results will still come within the scope of the invention. No limitations with respect to the specific embodiments described herein are intended or should be inferred.

Figure 1:
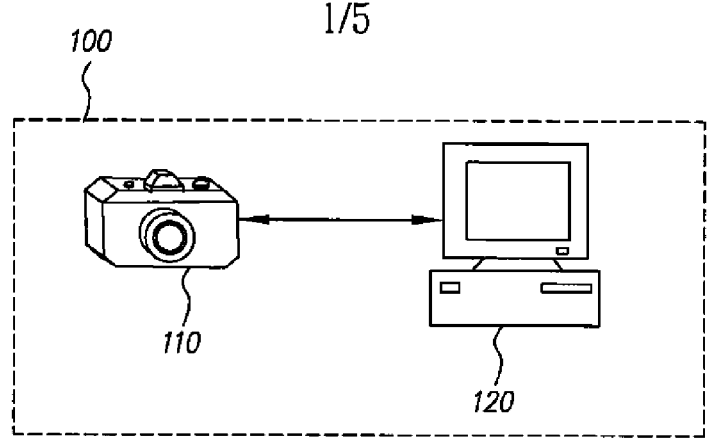
FIG. 1 shows a block diagram of a digital imaging system in which aspects of the present invention may be implemented.

FIG. 1 shows a block diagram of an illustrative digital imaging system 100 in which aspects of the present invention may be implemented. This particular digital imaging system includes a digital camera 110 and a computer 120. Nevertheless, a wide variety of other configurations is contemplated and would come within the scope of the invention. Rather than the digital camera, the imaging system could, for example, include a film camera with an optical scanner operative to convert images developed on film into digital data. Alternatively, the imaging system could include a video camera instead of a still camera, or a camera that is capable of capturing both still images and video. The digital camera may be combined with another device such as a mobile telephone, personal digital assistant (PDA) or wireless electronic mail device.

Figure 2:
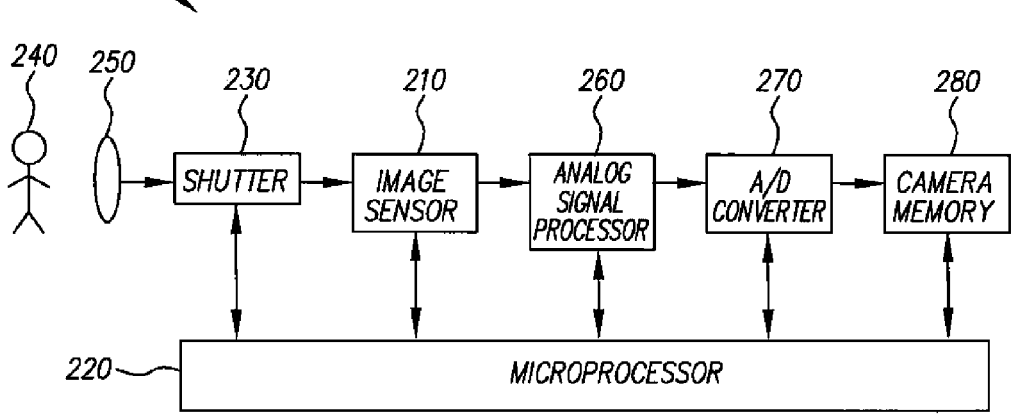
FIG. 2 shows a block diagram of the digital camera in the FIG. 1 digital imaging system.
Figure 3:
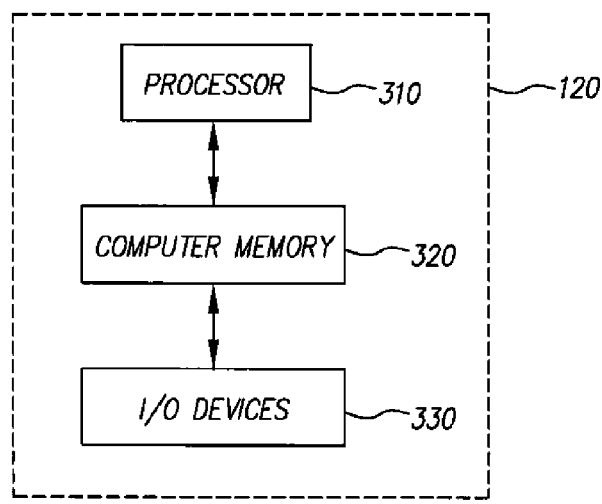
FIG. 3 shows a block diagram of the computer in the FIG. 1 digital imaging system.

FIGS. 2 and 3 show further details of the digital camera 110 and the computer 120, respectively. The digital camera includes an image sensor 210 which includes a two dimensional array of photosites corresponding to picture elements (pixels) of the image. The image sensor can include, for example, a charged coupled device (CCD) or a complementary metal-oxide-semiconductor (CMOS) imager. The pixels of the image sensor are preferably covered by a conventional Bayer-type color filter to form a red-green-blue (RGB) color filter array (CFA). An image is captured under the control of a microprocessor 220 which causes a shutter 230 to open and an image of a subject 240 to be applied by a lens 250 to the image sensor. When the image sensor is exposed to the image light, analog image charge is produced in respective pixels. After the shutter is closed, the charge information produced by the image sensor is transmitted to an analog signal processor 260. The analog signal processor converts the received charge information to analog image signals corresponding to respective pixels in the image sensor. The analog image signals from the analog signal processor are then sent to an analog-to-digital (A/D) converter 270 which generates a digital signal value for each pixel from the analog input signals. With 10-bit digitization, for example, each pixel is assigned a signal value between 0 and 1,023. The captured digital image signals are stored in a camera memory 280.

The computer 120 includes a processor 310, a computer memory 320 and input/output (I/O) devices 330. The computer may be, for example, a general purpose computer such as a personal computer from what is commonly referred to as the "IBM PC Compatible" class of computers. Alternatively, the computer may be a purpose specific computing device.

Once a digital image is stored in the camera memory 280, it may be transferred to the computer memory 320 using a direct or wireless connection, or, alternatively, through the use of a conventional memory card that will be familiar to one skilled in the art. Once stored in the computer memory, the computer 120 may display, modify, print or transmit the stored digital images depending on the desires of the end user.

Figure 4A:
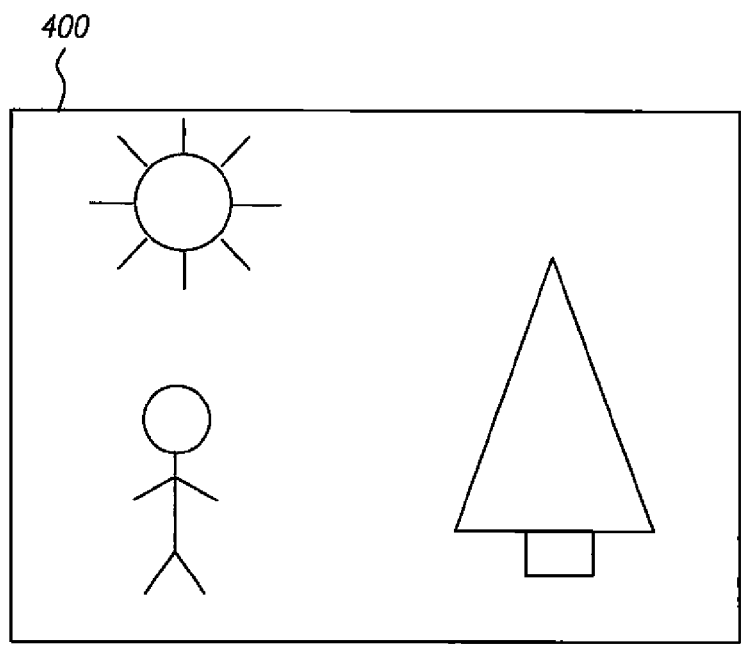
FIG. 4A shows a digital image generated in the FIG. 1 digital imaging system.
Figure 4B:
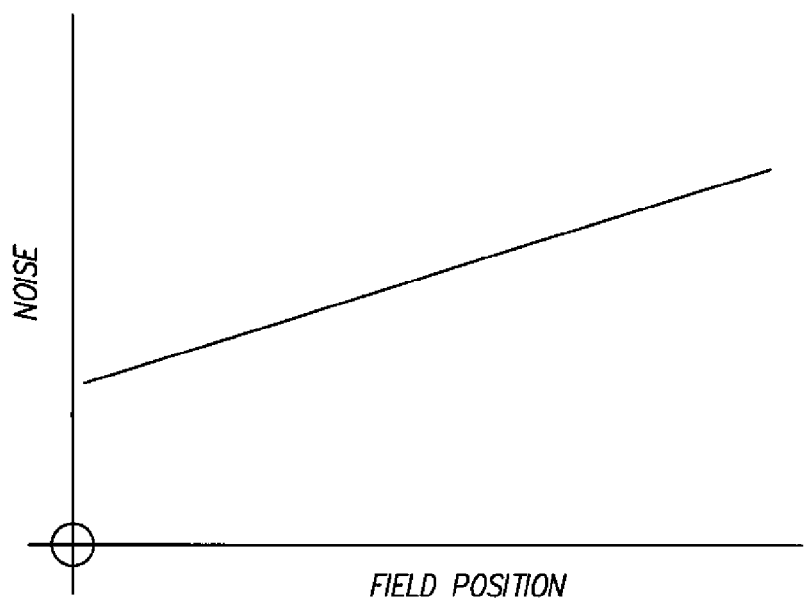
FIG. 4B shows a graph of noise level as a function of field position in the FIG. 4A digital image.

For purposes of illustrating aspects of the invention, it will be assumed that a given digital image generated by the digital camera 110 and stored in the computer memory 320 includes a noise level that varies as a function of field position. More specifically, it will be assumed that a digital image 400 appears as illustrated in FIG. 4A. In this particular example, the noise level increases as one moves away from the center of the digital image, as indicated by the increasing density of dots toward the edges of the image frame. Noise as a function of field position is shown in graphical form in FIG. 4B.

Advantageously, the ability to implement aspects of the invention is not dependent on the precise source of the field dependent noise, so long as noise level as a function of field position is characterized. The noise in the digital image 400 may be result of various different mechanisms. For example, it may result in part from defective or non-optimal electronic components in the digital camera 110. The noise may also or alternatively result from the application of a correction algorithm to the digital image, such as a field position dependent blur correction algorithm of the type described in the above-cited U.S. Pat. No. 6,628,329.

The manufacturer of the digital camera 110 will preferably characterize noise level as a function of field position for images produced by the digital camera. If the noise is primarily a result of the components in the digital camera, the noise level as a function of field position may be obtained by the manufacturer by generating and analyzing digital images of test targets using conventional noise analysis techniques that will be familiar to one skilled in the art. If, on the other hand, the noise is primarily a function of applying a field position dependent blur correction algorithm to the digital image, then the noise at a given field position in the image will largely be proportional to the gain factor applied to the blur correction algorithm at that field position. This gain factor is described in detail in the above-cited U.S. Pat. No. 6,628,329.

Once determined, the manufacturer may then store this noise profile (e.g., noise level as a function of field position) for the digital camera 110 in, for example, the camera memory 280 or on a magnetic or optical storage medium that is included with the digital camera and may be read by the computer 120.

Figure 5:
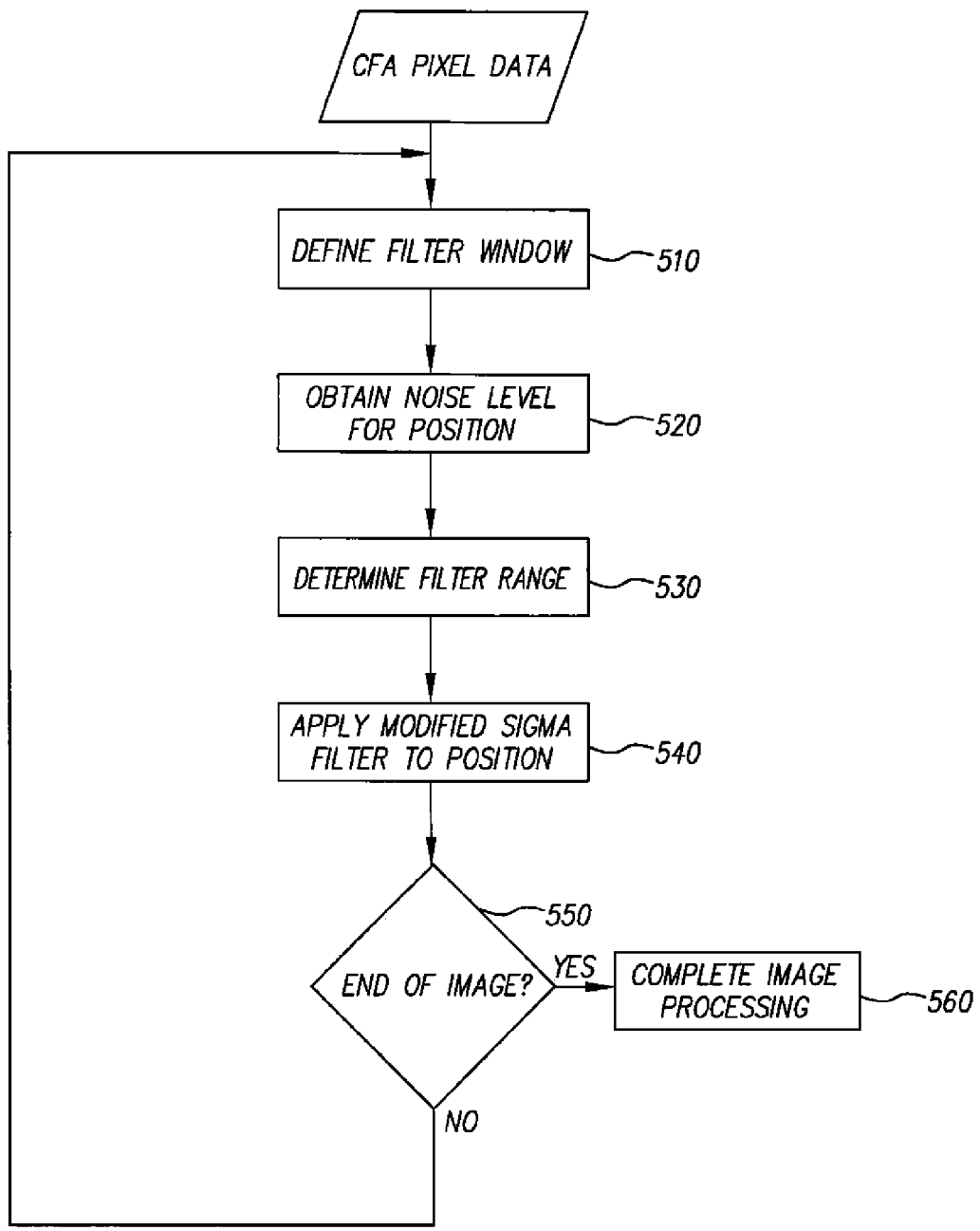
FIG. 5 shows a flow chart of an illustrative method for implementing aspects of the invention in the FIG. 1 digital imaging system.

After the noise profile is made available to the computer 120, a noise reducing algorithm in accordance with aspects of the invention may be applied to the digital image 400 as part of the image modification capabilities of the computer. FIG. 5 shows a flow diagram of an illustrative method for applying a field position dependent noise reducing algorithm to the digital image. In this particular illustrative embodiment, the noise reducing algorithm is a modified sigma filter algorithm, but the invention is not limited to this specific type of noise filtering. The noise reducing algorithm operates on the pixel data constituting the digital image from the CFA of the digital camera 110. As mentioned above, the CFA includes the image sensor 210 with a Bayer-type filter. Accordingly, each pixel is filtered to record only one of three colors: 25% of the pixels are filtered to detect red light, 25% of the pixels are filtered to detect blue light, and 50% of the pixels are filtered to detect green light.

Figure 6:
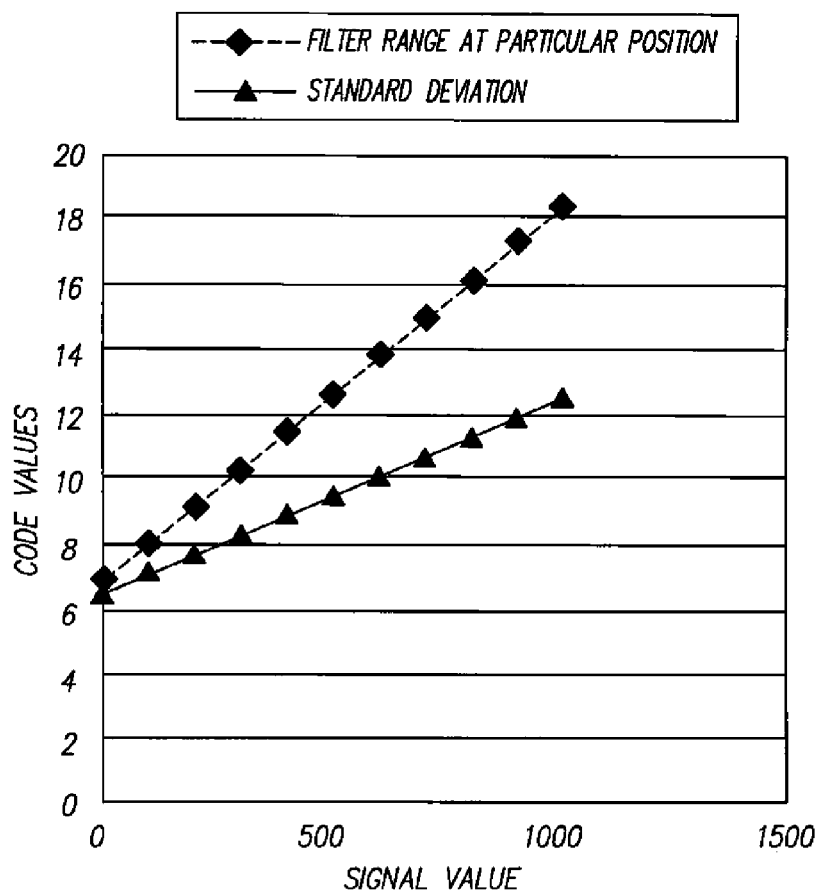
FIG. 6 shows a graph of standard deviation and filter range versus signal value for the FIG. 4A digital image.

Steps 510-560 in FIG. 5 describe steps involved in the application of the modified sigma filter algorithm to the digital image 400 by the computer 120. As described earlier, the signal value of a pixel being filtered in a conventional sigma filter algorithm is replaced by a signal value which is determined by averaging the signal values of neighboring pixels that have signal values that lie within a standard deviation range of the signal value of the pixel being filtered. The modified sigma filter algorithm also uses such a standard deviation. The standard deviation range is preferably determined by the manufacturer for the imaging device using a set of color targets. The color targets can include a number of patches spanning the color gamut with varying brightnesses, hues and saturations. The manufacturer images these color patches and then examines the resultant digital images to determine the statistical distribution of pixel signal values for a particular color patch. From this data, a relationship between standard deviation and signal value is determined. The lower set of data in FIG. 6 shows such a relationship for the digital camera 110. Like the noise profile data, this data may be stored in the digital camera itself or made available to the computer by other means.

The modified sigma filter algorithm also uses a filter range to determine which pixels near a pixel being filtered are included when averaging signal values. In contrast to a conventional sigma filter algorithm, however, the filter range used in the modified sigma filter algorithm is not only a function of the standard deviation at the signal value of the pixel being filtered, but is also a function of the noise level at a particular field position in the image being filtered. In this way, the modified sigma filter algorithm becomes one that adapts to field position dependent noise.

Figure 7:
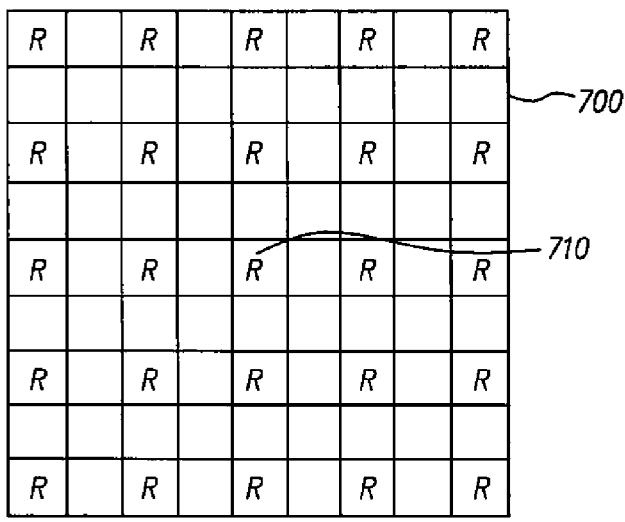
FIG. 7 shows a diagram of red pixels in a filter window in the FIG. 4A digital image.

In step 510, the processor 310 in the computer 120 defines a filter window over a pixel to be filtered. FIG. 7 shows an example of such a filter window 700. The filter window includes nine rows and nine columns of pixels, although other filter window sizes may be utilized. A red pixel to be filtered 710 is at the center of the filter window. Only the red pixels are shown in the filter window since these are the only pixels that will be used to filter a red pixel. If, instead, the pixel to be filtered were green or blue, only green or blue pixels, respectively, would be considered.

In step 520, the processor 310 determines the field position of the filter window 700 in the digital image 400 and obtains the noise level for this field position from the stored noise profile. Such a noise level is also referred to in the context of the present embodiment as a "local" noise level.

In step 530, the processor 310 determines the filter range to be applied to the filter window 700. To do so, the processor first obtains the standard deviation for a signal value equal to that of the pixel to be filtered 710 by referencing the stored data corresponding to the lower data set in FIG. 6. The processor then modifies this standard deviation by the noise level that was determined in step 520 for the particular field position of the filter window in the digital image 400.

The upper set of data in FIG. 6 shows the filter range as a function of signal value of the pixel being filtered for a particular field position in the digital image 400. The filter range may be calculated from the standard deviation data and the local noise data in several different ways. The filter range may, for example, be equal to:

$$R_x = aN_{window}\sigma_x + bN_{window},$$

where $R_x$ is the filter range for a particular signal value x, $\sigma_x$ is the standard deviation for the signal value x, a and b are proportionality constants, and $N_{window}$ is the local noise level at the field position of the filter window. The values of these variables will depend on the desired level of filtering and suitable values will be readily apparent to one skilled in the art. Moreover, it should be noted that this formula is illustrative and that the filter range may also be determined by a formula including different terms from the ones presented here. The formula could, for example, include additional terms comprising higher powers of $\sigma_x$ and/or $N_{window}$.

In step 540, the modified sigma filter algorithm is applied to the pixel being filtered 710. Those pixels in the filter window 700 having a signal value within the filter range of the pixel being filtered are averaged and the signal value of the pixel being filtered is replaced with this average signal value. At step 550, it is determined whether the last pixel in the digital image 400 has been reached. If not, the processor 310 steps to the next pixel and again applies steps 510-550. If the last pixel has been reached at step 550, the processor completes the image processing in step 560.

Figure 8:
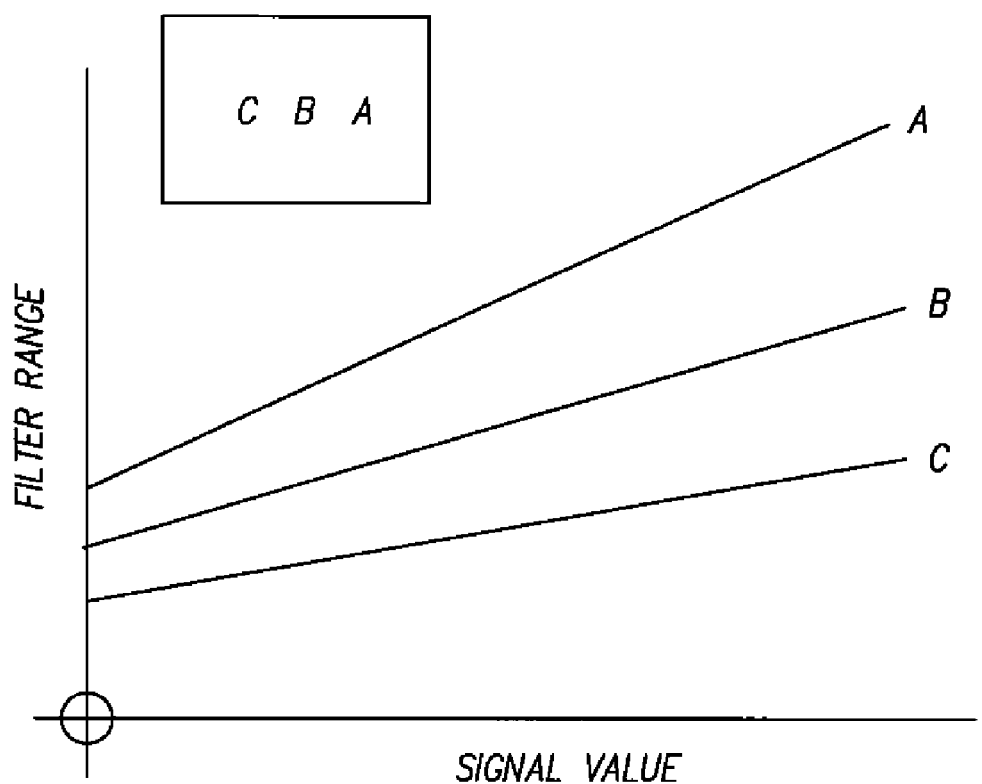
FIG. 8 shows a graph of filter range versus signal value for various field positions in the FIG. 4A digital image.

FIG. 8 shows filter range versus signal value of the pixel being filtered as a function of different field positions in the digital image 400. Position A (near the edge of the digital image) has a higher local noise level than position B, which, in turn, has a higher local noise level than position C (near the center of the image). Accordingly, the filter ranges for positions A and B are made substantially higher than that for position C for any given signal value of the pixel being filtered. This has the effect of including more pixels within the filter window 700 in the averaging process at positions A and B than are included at position C. This is logical since the signal values of the pixels in the filter windows at positions A and B are likely to deviate to a greater degree from the pixel being filtered as a result of noise than the pixels in the window at position C. Advantageously, such a process substantially reduces the noise in the digital image. Moreover, such a process substantially reduces the chance that the processed digital image will contain an observable noise gradient across the image field. Perceived noise in the digital image being filtered is thereby substantially reduced by using a method in accordance with aspects of the invention.

While the process described above in FIG. 5 uses a modified sigma filter algorithm, the invention is not limited to this particular type of noise reducing algorithm. Instead, the invention applies to any noise reducing algorithm that is adapted to respond to local noise levels. One skilled in the art will recognize these other noise reducing filters and how to adapt them in accordance with aspects of the invention. Such noise reducing algorithms include, for example, speckle filtering, mean filtering, median filtering and local region filtering.

Moreover, while the field position dependent noise reducing algorithm in the above-described embodiment was applied using the computer 120, it may instead be preferable to have the digital camera 110 itself apply the noise reducing algorithm (e.g., using the camera microprocessor 220) as part of the camera's internal image processing capabilities. Such a configuration would allow the digital camera to produce fully processed digital images without the need for external image processing hardware and software. The fully processed images could then, for example, be sent directly to a printer or display device.

The invention has been described with reference to illustrative embodiments. However, it will be appreciated that variations and modifications can be effected by a person of ordinary skill in the art without departing from the scope of the invention.

PARTS LIST 100 digital imaging system
110 digital camera
120 computer
210 image sensor
220 microprocessor
230 shutter
240 subject
250 lens
260 analog signal processor
270 analog-to-digital converter
280 camera memory
310 processor
320 computer memory
330 input/output devices
400 digital image
510-560 processing steps
700 filter window
710 pixel being filtered

What is claimed is:
1. A method of reducing noise in a digital image generated by an imaging device, the digital image including a plurality of pixels, each pixel having a respective signal value, noise being unwanted random variations in the digital image, the method comprising:
obtaining information which specifies a predetermined level of unwanted random variations as a function of field position for the digital image; and
applying a noise reducing algorithm to the digital image to reduce the level of unwanted random variations while varying one or more parameters of the noise reducing algorithm as a function of field position in the digital image based on the obtained predetermined level of unwanted random variations as a function of field posi- tion, wherein the application of the noise reducing algorithm to the digital image includes:
- defining a window over a pixel to be filtered, the window comprising a portion of the plurality of pixels in the digital image:
- determining a filter range, the filter range being a function of the predetermined level of unwanted random variations at the field position of the window:
- determining an average signal value, the average signal value being an average of the signal values of those pixels within the window having signal values within the filter range of the signal value of the pixel to be filtered; and
- replacing the signal value of the pixel to be filtered with the average signal value.

2. The method of claim 1, wherein the imaging device comprises at least one of a still camera, a video camera and an optical scanner.

3. The method of claim 1, wherein the method is implemented in the imaging device.

4. The method of claim 1, wherein the method is implemented in a computer separate from the imaging device.

5. The method of claim 4, wherein the computer comprises a general purpose computer.

6. The method of claim 1, wherein the imaging device comprises a Bayer-type color filter array.

7. The method of claim 1, wherein the level of unwanted random variations in the digital image is at least partially a result of applying a blur correction algorithm to the digital image.

8. The method of claim 7, wherein a strength of the blur correction algorithm is field position dependent.

9. The method of claim 1, wherein the filter range is further a function of a standard deviation of the signal values of pixels in an image of a test color target.

10. An article of manufacture including a non-transitory machine-readable medium comprising software operative to cause a processor-based device including a processor and memory to implement the steps of the method in claim 1.

11. An apparatus for reducing noise in a digital image, the digital image including a plurality of pixels, each pixel having a respective signal value, noise being unwanted random variations in the digital image, for which a level of unwanted random variations as a function of field position has been predetermined, the apparatus comprising:
- a memory, the memory operative to store data which specifies the predetermined level of unwanted random variations as a function of field position for the digital image; and
- a processor coupled to the memory, the processor operative to apply a noise reducing algorithm to the digital image to reduce the level of unwanted random variations while varying one or more parameters of the noise reducing algorithm as a function of field position in the digital image based on the predetermined level of unwanted random variations as a function of field position, wherein the application of the noise reducing algorithm to the digital image includes:
  - defining a window over a pixel to be filtered, the window comprising a portion of the plurality of pixels in the digital image:
  - determining a filter range, the filter range being a function of the predetermined level of unwanted random variations at the field position of the window:
  - determining an average signal value, the average signal value being an average of the signal values of those pixels within the window having signal values within the filter range of the signal value of the pixel to be filtered: and
  - replacing the signal value of the pixel to be filtered with the average signal value.

12. The apparatus of claim 11, wherein the apparatus is implemented in a still camera, video camera or optical scanner.

13. The apparatus of claim 11, wherein the apparatus is implemented in a general purpose computer.

14. The apparatus of claim 11, wherein the filter range is further a function of a standard deviation of the signal values of pixels in an image of a test color target.

15. A system for reducing noise in a digital image, the digital image including a plurality of pixels. each pixel having a respective signal value, noise being unwanted random variations in the digital image, for which a level of unwanted random variations as a function of field position has been predetermined, the system comprising:
- an imaging device, the imaging device operative to capture the digital image; and
- a computer comprising a memory and a processor, the memory operative to store data which specifies the predetermined level of unwanted random variations as a function of field position for the digital image, and the processor coupled to the memory and operative to apply a noise reducing algorithm to the digital image to reduce the level of unwanted random variations while varying one or more parameters of the noise reducing algorithm as a function of field position in the digital image based on the predetermined level of unwanted random variations as a function of field position, wherein the application of the noise reducing algorithm to the digital image includes:
  - defining a window over a pixel to be filtered, the window comprising a portion of the plurality of pixels in the digital image;
  - determining a filter range, the filter range being a function of the predetermined level of unwanted random variations at the field position of the window:
  - determining an average signal value, the average signal value being an average of the signal values of those pixels within the window having signal values within the filter range of the signal value of the pixel to be filtered; and
  - replacing the signal value of the pixel to be filtered with the average signal value.

16. The system of claim 15, wherein the imaging device comprises at least one of a still camera, a video camera and an optical scanner.

17. The system of claim 15, wherein the filter range is further a function of a standard deviation of the signal values of pixels in an image of a test color target.

* * * * *